US012409462B2

United States Patent

(12) United States Patent
Zhou et al.

(10) Patent No.: US 12,409,462 B2
(45) Date of Patent: Sep. 9, 2025

(54) WATER OUTLET DEVICE

(71) Applicant: XIAMEN WATER NYMPH SANITARY TECHNOLOGY CO., LTD., Fujian (CN)

(72) Inventors: Huaqiang Zhou, Fujian (CN); Weihai Mu, Fujian (CN)

(73) Assignee: XIAMEN WATER NYMPH SANITARY TECHNOLOGY CO., LTD., Xiamen (CN)

( * ) Notice: Subject to any disclaimer, the term of this patent is extended or adjusted under 35 U.S.C. 154(b) by 378 days.

(21) Appl. No.: 18/155,776

(22) Filed: Jan. 18, 2023

(65) Prior Publication Data

US 2023/0234078 A1 Jul. 27, 2023

(30) Foreign Application Priority Data

Jan. 25, 2022 (CN) ......................... 202210087859.5
Jan. 25, 2022 (CN) ......................... 202220205269.3

(51) Int. Cl.
*B05B 1/16* (2006.01)

(52) U.S. Cl.
CPC ................................. *B05B 1/1636* (2013.01)

(58) Field of Classification Search
CPC ........... B05B 1/12; B05B 1/16; B05B 1/1609; B05B 1/1618; B05B 1/1636; E03C 1/0405; E03C 1/08; E03C 1/084
See application file for complete search history.

(56) References Cited

U.S. PATENT DOCUMENTS

2014/0217202 A1* 8/2014 Stein ......................... E03C 1/08 239/392
2014/0217314 A1* 8/2014 Kao ........................ F16K 21/06 251/12
2019/0194918 A1* 6/2019 Schurle ................... E03C 1/084
2020/0263806 A1* 8/2020 Kao .......................... E03C 1/08
2021/0148100 A1* 5/2021 Zhou ..................... E03C 1/0405
2022/0213977 A1* 7/2022 Kao ...................... E03C 1/0404

FOREIGN PATENT DOCUMENTS

CN 103120990 A * 5/2013 ............... B05B 1/16
CN 111804448 A 10/2020
CN 111827417 A 10/2020

* cited by examiner

*Primary Examiner* — Darren W Gorman

(57) ABSTRACT

The present invention discloses a water outlet device, comprising a fluid diverting mechanism, a seal having elasticity, a water inlet mechanism having a water inlet member with elasticity at a water inlet end, and a diversion mechanism rotatably connected to the water inlet mechanism; the water inlet mechanism comprises a water inlet channel, and the fluid diverting mechanism comprises a first water outlet channel; the diversion mechanism comprises a second water outlet channel; the seal is capable of placing the water inlet channel in communication with the first water outlet channel or the second water outlet channel when the diversion mechanism is movable relative to the fluid diverting mechanism. The present invention improves the yield of the product by absorbing the tolerances of the water outlet device as a whole by means of the seal with elasticity and the deformation of the water inlet member with elasticity.

15 Claims, 7 Drawing Sheets

WATER OUTLET DEVICE

CROSS REFERENCE TO RELATED APPLICATIONS

The present application claims the benefit of Chinese Patent Application Nos. 202220205269.3 and 202210087859.5 filed on Jan. 25, 2022. All the above are hereby incorporated by reference in their entirety.

TECHNICAL FIELD

The present invention relates to the field of bathroom and in particular to a water outlet device.

BACKGROUND ART

At present, there are a variety of water outlet devices on the market, which are installed at the water outlet of sanitary products to control or regulate the water flow amount and state.

However, the existing water outlet devices have the defects of single function, complicated structure and being easy to be damaged by frequent state conversion.

In view of the above-mentioned defects, Chinese patent documents disclose a multi-functional water outlet device (Application No. 202010646138.4) and a water outlet device (Application No. 202010646694.1). Since the two water outlet devices have a fluid diverting mechanism owing more matching points with other parts in the axial direction, there is a problem of excessive accumulated tolerance in the assembly, so that a large amount of interference occurs between the fluid diverting mechanism and the water inlet component during the matching, resulting in that the water passage cannot be completely switched into place, thus resulting in that the water outlet function cannot be completely switched and the product yield is low.

SUMMARY OF THE INVENTION

The technical problem to be solved by the present invention is as follows. A water outlet device is provided to reduce product tolerances and improve product yield.

In order to solve the above technical problem, the technical solution adopted by the present invention is as follows:

- a water outlet device comprises a fluid diverting mechanism, a seal having elasticity, a water inlet mechanism having a water inlet member with elasticity at a water inlet end, and a diversion mechanism rotatably connected to the water inlet mechanism;
- the water inlet mechanism comprises a water inlet channel;
- the fluid diverting mechanism comprises a first water outlet channel;
- the diversion mechanism comprises a second water outlet channel;
- the seal is mounted to a water inlet end of the fluid diverting mechanism, and the seal is capable of placing the water inlet channel in communication with the first water outlet channel or the second water outlet channel when the diversion mechanism is movable relative to the fluid diverting mechanism; and
- when the water inlet channel communicates with the second water outlet channel, the seal can be pressed against a side of the water inlet member.

The advantageous effect of the present invention is that a seal having elasticity is provided at the water inlet end of the fluid diverting mechanism, and a water inlet member having elasticity is provided at the water inlet end of the water inlet mechanism, so that the seal can flexibly contact with the water inlet member when the seal performs relative movement with the fluid diverting mechanism, thereby enabling the tolerance generated during assembly of the water outlet device to be absorbed by deformation between the seal and the water inlet member. Thereby, the invention ensures that it is switched in place each time the communication relationship between the water inlet channel and the first water outlet channel and the second water outlet channel, so as to achieve the purpose of improving the product yield.

DESCRIPTION OF REFERENCE NUMERALS

Figure 1:
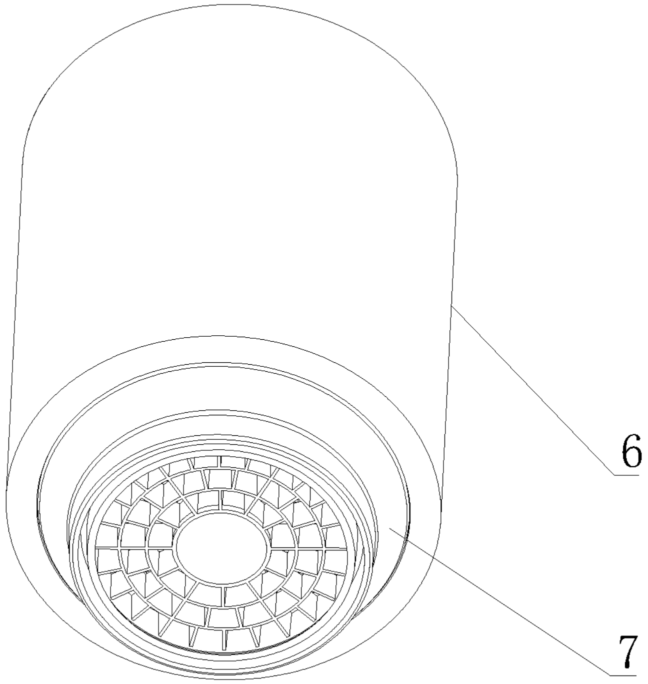
FIG. 1 is a schematic view showing the structure of a water outlet device according to the present invention.

- 1, water inlet mechanism; 10, water inlet channel; 11, water diverting body; 12, water outlet body; 13, water inlet member; 131, water inlet net; 132, water outlet hole;
- 2, diversion mechanism; 20, second water outlet channel; 21, mounting hole; 22, step; 221, first step surface; 222, second step surface;
- 3, seal; 30, buffer space 31, first diversion slope; 32, second diversion slope;
- 4, fluid diverting mechanism; 40, first water outlet channel; 41, fluid diverting body; 411, inlet; 412, protrusion; 413, first limiting stage; 414, second limiting stage; 42, reset member; 43, functional member;
- 5, elastic seal; 6, housing; 7, water outlet rectifying net.

DETAILED DESCRIPTION OF THE INVENTION

In order to explain the technical contents, achieved objects and effects of the present invention in detail, a description is made in combination with the embodiments and the accompanying drawings.

With reference to FIGS. 1-7, a water outlet device includes a fluid diverting mechanism 4, a seal 3 having elasticity, a water inlet mechanism 1 having a water inlet member 13 with elasticity at a water inlet end, and a diversion mechanism 2 rotatably connected to the water inlet mechanism 1.

The water inlet mechanism 1 includes a water inlet channel 10.

The fluid diverting mechanism 4 includes a first water outlet channel 40.

The diversion mechanism 2 includes a second water outlet channel 20.

The seal 3 is mounted to a water inlet end of the fluid diverting mechanism 4, and the seal 3 is capable of placing the water inlet channel 10 in communication with the first water outlet channel 40 or the second water outlet channel 20 when the diversion mechanism 2 is movable relative to the fluid diverting mechanism 4.

When the water inlet channel 10 communicates with the second water outlet channel 20, the seal 3 can be pressed against a side of the water inlet member 13.

The working principle of the present invention is as follows.

By providing the water inlet member 13 having elasticity and the seal 3 having elasticity, when the diversion mechanism 2 moves relative to the fluid diverting mechanism 4, the water inlet member 13 and the seal 3 flexibly contact to generate deformation so as to absorb the tolerance of the water outlet device as a whole, thereby improving the reliability of the water outlet channel switching and improving the product yield.

As known from the above description, the present invention has following advantageous effects. A seal 3 is provided at the water inlet end of the fluid diverting mechanism 4, and a water inlet member 13 is provided at the water inlet end of the water inlet mechanism 1, so that the seal 3 can flexibly contact with the water inlet mechanism 1 when the seal 3 performs relative movement with the fluid diverting mechanism 4, or the water inlet member 13 can contact with the fluid diverting mechanism 4 when the fluid diverting mechanism 4 performs relative movement with the diversion mechanism 2, thereby enabling it to absorb the tolerance generated via deformation between the seal 3 and the water inlet member 13 or the fluid diverting mechanism 4 and the water inlet member 13 when the water outlet device is assembled. Furthermore, the invention ensures that it is switched in place each time the communication relationship between the water inlet channel 10 and the first water outlet channel 40 and the second water outlet channel 20, so as to achieve the purpose of improving the product yield.

Further, an elastic seal 5 is embedded in a water outlet end of the water inlet mechanism 1.

When the water inlet channel 10 communicates with the first water outlet channel 40, the fluid diverting mechanism 4 can be pressed against the elastic seal 5.

It can be seen from the above-mentioned description that the elastic seal 5 is provided, on the one hand, for providing an axial supporting force for the fluid diverting mechanism 4 when the water inlet channel 10 communicates with the first water outlet channel 40. The elastic seal 5 can also generate deformation for absorbing tolerances. On the other hand, the elastic seal 5 is provided for improving the sealing performance between the fluid diverting mechanism 4 and the water inlet mechanism 1 and reducing the probability of water leakage.

Further, the water inlet member 13 has a water inlet net 131 recessed in an axial direction along a water inlet end of the water inlet mechanism 1 to a water outlet end of the water inlet mechanism 1.

A plurality of water outlet holes 132 are provided around the side wall in the radial direction of the water inlet net 131.

It can be seen from the above-mentioned description that a plurality of water outlet holes 132 are provided around the side wall of the water inlet net 131, so that the water flows into the water inlet mechanism 1 from the side surface of the water inlet net 131 to perform rectification and filtration.

Further, the side wall in the radial direction of the water inlet net 131 inclines gradually and concavely along the water inlet end of the water inlet mechanism 1 to the water outlet end of the water inlet mechanism 1.

As can be seen from the above description, the side wall in the radial direction of the water inlet net 131 is inclined to provide a larger deformation space for the water inlet member 13 to absorb larger tolerances.

Further, the fluid diverting mechanism 4 includes a fluid diverting body 41.

The seal 3 is sleeved outside a water inlet end of the fluid diverting body 41.

Further, a first limiting stage 413 is provided outside the water inlet end of the fluid diverting body 41, and the seal 3 is sleeved outside the first limiting stage 413.

Further, the water inlet end of the fluid diverting body 41 is further provided with a second limiting stage 414. The first limiting stage 413 and the second limiting stage 414 are provided in sequence along the axial direction of the fluid diverting body 41. The seal 3 can be pressed against the second limiting stage 414.

It can be seen from the above-mentioned description that the first limiting stage 413 and the second limiting stage 414 are provided for improving the tightness of the connection between the seal and the fluid diverting mechanism 4.

Further, a side of the seal 3 facing towards the water inlet end of the water inlet mechanism 1 has a first diversion slope 31. A side of the seal 3 facing towards the water outlet end of the water inlet mechanism 1 has a second diversion slope 32.

The first diversion slope 31 inclines gradually and convexly along the water inlet end of the water inlet mechanism 1 to the water outlet end of the water inlet mechanism 1.

The second diversion slope 32 inclines gradually and convexly along the water outlet end of the water inlet mechanism 1 to the water inlet end of the water inlet mechanism 1.

When the water inlet channel 10 communicates with the first water outlet channel 40, the second diversion slope 32 is pressed against the water inlet mechanism 1.

It can be seen from the above-mentioned description that the first diversion slope 31 and the second diversion slope 32 are provided for reducing the resistance received by the seal 3 in the axial direction when the fluid diverting mechanism 4 moves in the axial direction, and improving the fluency when switching in different water outlet states.

Further, the top of the seal 3 and the top of the fluid diverting body 41 form a buffer space 30 in the axial direction of the fluid diverting body 41.

As can be seen from the above description, the buffer space 30 is formed for providing a larger deformation space for the seal 3 to absorb larger tolerances.

Further, the fluid diverting mechanism 4 includes a fluid diverting body 41, a reset member 42, and a functional member 43.

The reset member 42 and the functional member 43 are successively arranged in the fluid diverting body 41 along the water inlet end of the fluid diverting body 41 to the water outlet end of the fluid diverting body 41.

Both ends of the reset member 42 are pressed against the water inlet end of the water inlet mechanism 1 and the functional member 43, respectively.

It can be seen from the above-mentioned description that the reset member 42 is provided for providing a reset driving force in an axial direction for the fluid diverting body 41 to ensure reliability when switching in different water outlet states. The functional member 43 is provided for enabling the water flowing out from the first water outlet channel 40 to achieve different water outlet states so as to meet different requirements of a user.

Embodiment 1

With reference to FIGS. 1-7, a water outlet device includes a water inlet mechanism 1 and a diversion mechanism 2 rotatably connected to the water inlet mechanism 1. The water inlet mechanism 1 includes a water inlet channel 10, and further includes a fluid diverting mechanism 4 and a seal 3 with elasticity. The fluid diverting mechanism 4 is installed in the water inlet mechanism 1 and is arranged through the axial center of the diversion mechanism 2. The fluid diverting mechanism 4 includes a first water outlet channel 40. The diversion mechanism 2 includes a second water outlet channel 20. During the movement of the diversion mechanism 2 relative to the fluid diverting mechanism 4, the water inlet channel 10 is brought into communication with either the first water outlet channel 40 or the second water outlet channel 20 via the seal 3.

With reference to FIGS. 2-5, an elastic seal 5 is embedded in the water outlet end of the water inlet mechanism 1. When the water inlet channel 10 communicates with the first water outlet channel 40, the fluid diverting mechanism 4 can be pressed against the elastic seal 5.

Figure 2:
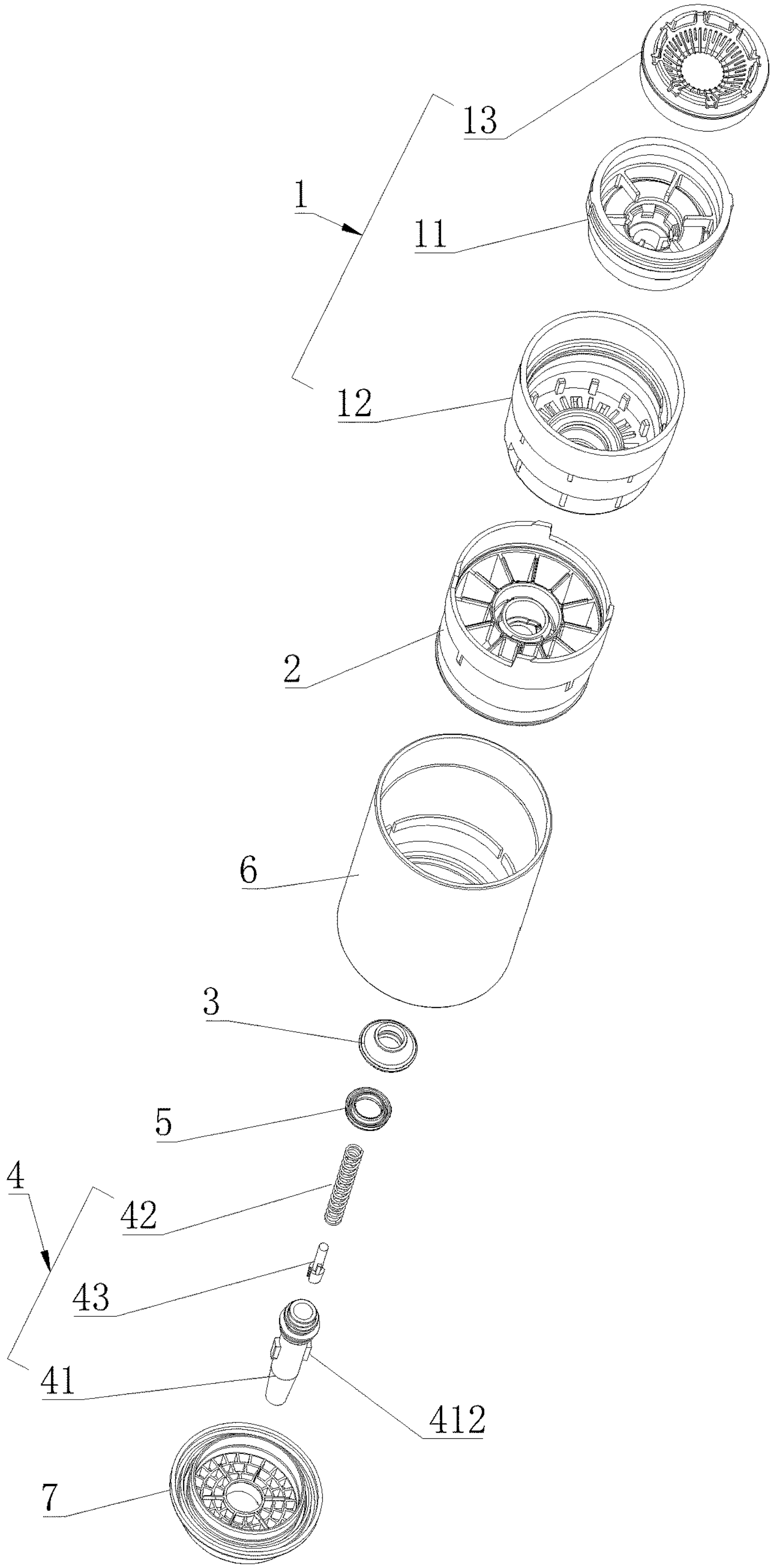
FIG. 2 is an exploded view of the water outlet device of the present invention.
Figure 3:
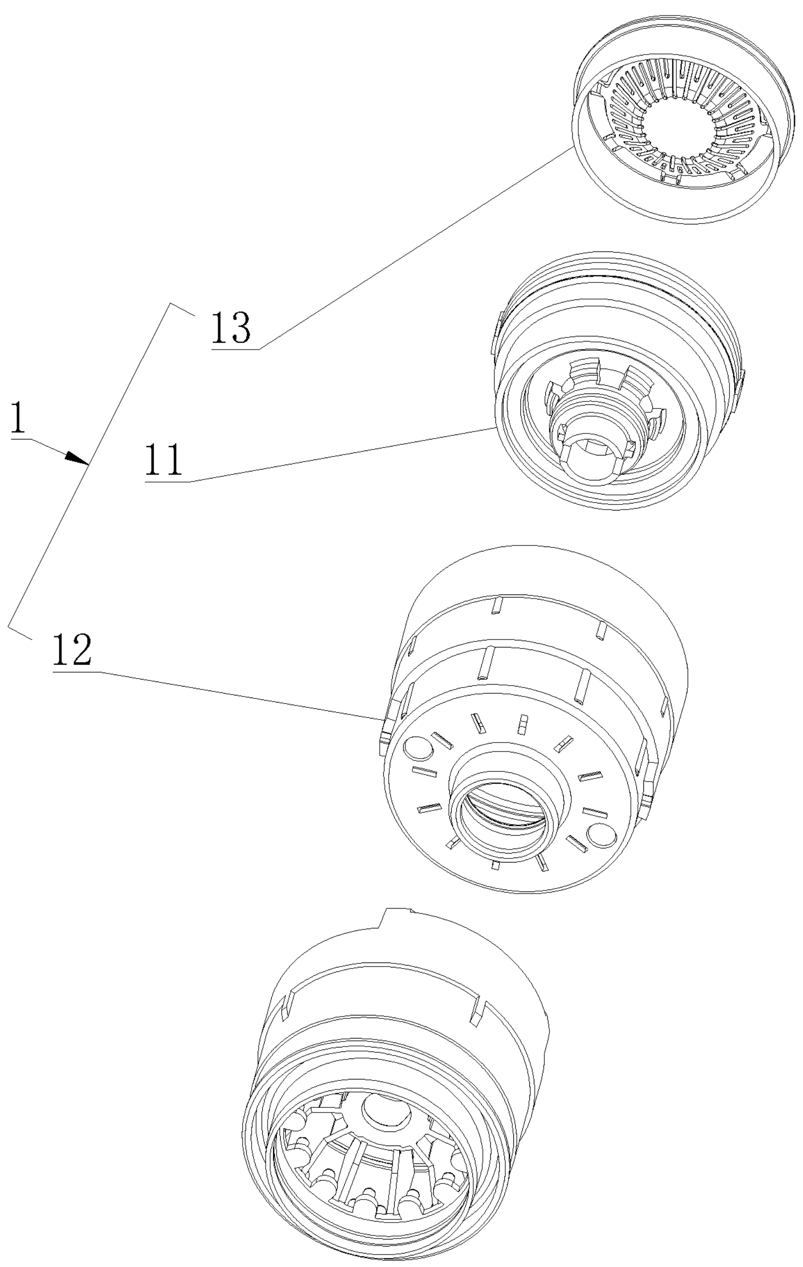
FIG. 3 is an exploded view of a water outlet device according to the present invention.

With reference to FIGS. 2 and 3, the water inlet mechanism 1 includes a water diverting body 11, a water outlet body 12 and a water inlet member 13. The water inlet member 13 is embedded on the top of the fluid diverting body 41. The fluid diverting mechanism 4 is successively arranged through the axial center of the fluid diverting body 41 and the water outlet body 12. The fluid diverting body 41 is embedded in the water outlet body 12.

Referring to FIG. 2, the fluid diverting mechanism 4 includes a fluid diverting body 41, a reset member 42, and a functional member 43. The reset member 42 and the functional part 43 are successively arranged in the fluid diverting body 41 along the water inlet end of the fluid diverting body 41 to the water outlet end of the fluid diverting body 41. Both ends of the reset member 42 are respectively pressed against the water inlet end of the water inlet mechanism 1 and the functional member 43. The seal 3 is sleeved outside the water inlet end of the fluid diverting body 41. Preferably, the reset member 42 is a spring. The functional member 43 can be selected according to actual requirements.

Figure 4:
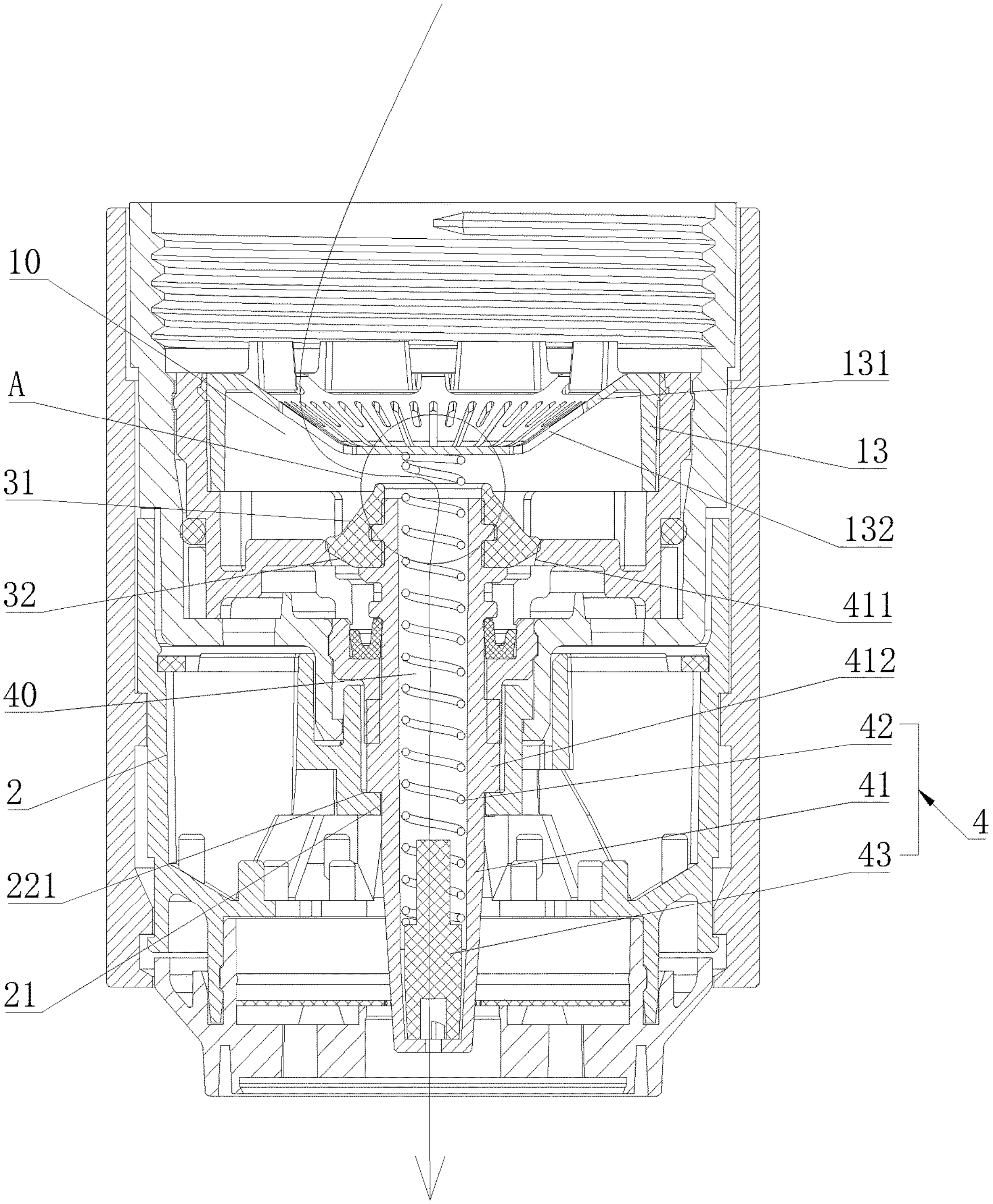
FIG. 4 is a cross-sectional view showing a state where a water inlet channel of the water outlet device of the present invention communicates with a first water outlet channel.
Figure 6:
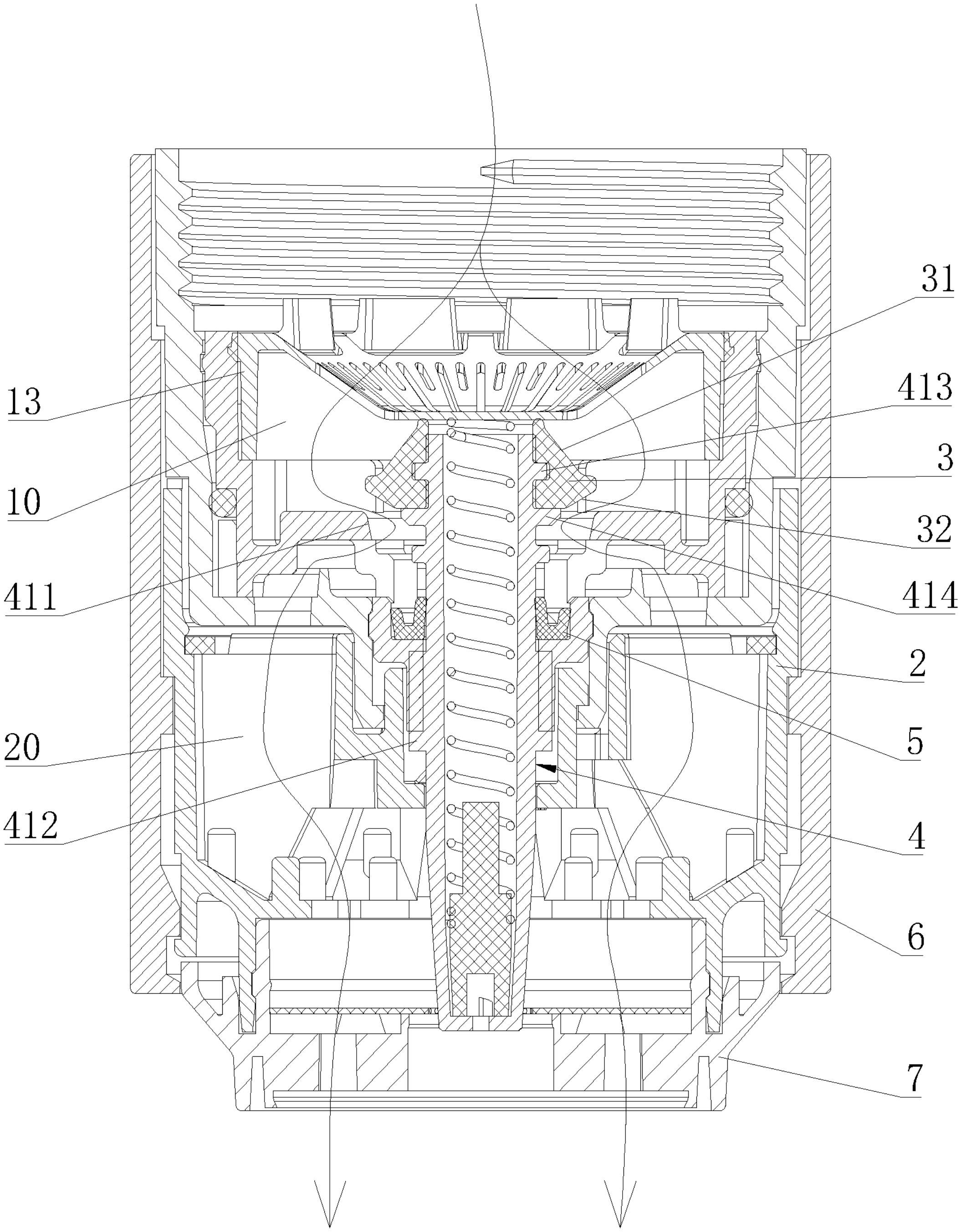
FIG. 6 is a sectional view showing a state where the water inlet channel of the water outlet device of the present invention communicates with a second water outlet channel.

With reference to FIGS. 4 and 6, a side of the seal 3 facing towards the water inlet end of the water inlet mechanism 1 has a first diversion slope 31. A side of the seal 3 facing towards the water outlet end of the water inlet mechanism 1 has a second diversion slope 32. The first guide slope inclines gradually and convexly along the water inlet end of the water inlet mechanism 1 to the water outlet end of the water inlet mechanism 1. The second guide slope inclines gradually and convexly along the water outlet end of the water inlet mechanism 1 to the water inlet end of the water inlet mechanism 1. When the water inlet channel 10 communicates with the first water outlet channel 40, the second diversion slope 32 is pressed against an inlet 411 of the fluid diverting body 41.

Figure 5:
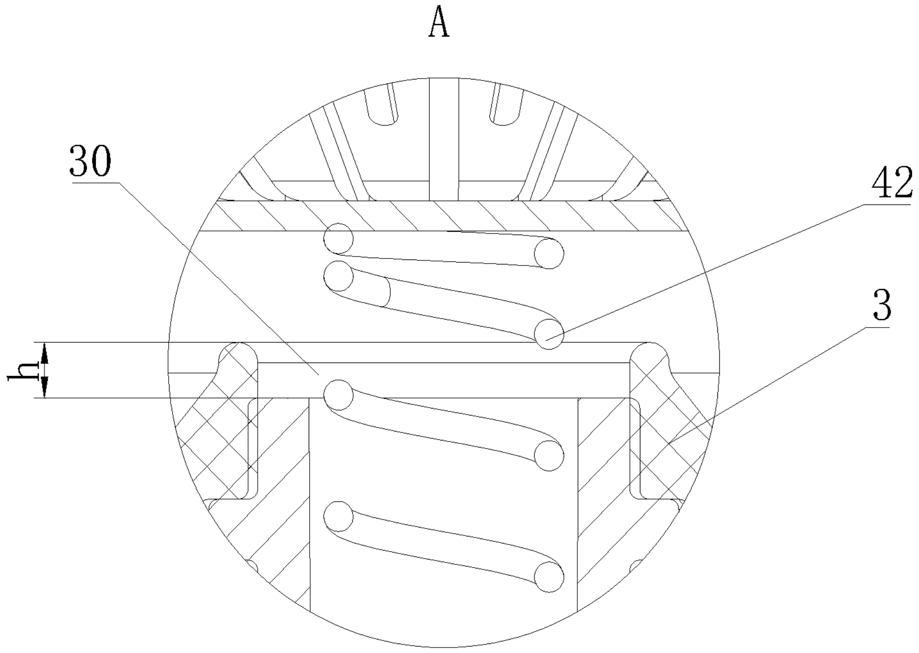
FIG. 5 is an enlarged view of a portion A of FIG. 4.

Referring to FIG. 5, the top of the seal 3 and the top of the fluid diverting body 41 form a buffer space 30 in the axial direction of the fluid diverting body 41. Preferably, the buffer space 30 has a height h of 0.3 mm to 0.7 mm in the axial direction. In the present embodiment, the height h of the buffer space 30 is preferably 0.5 mm.

Figure 7:
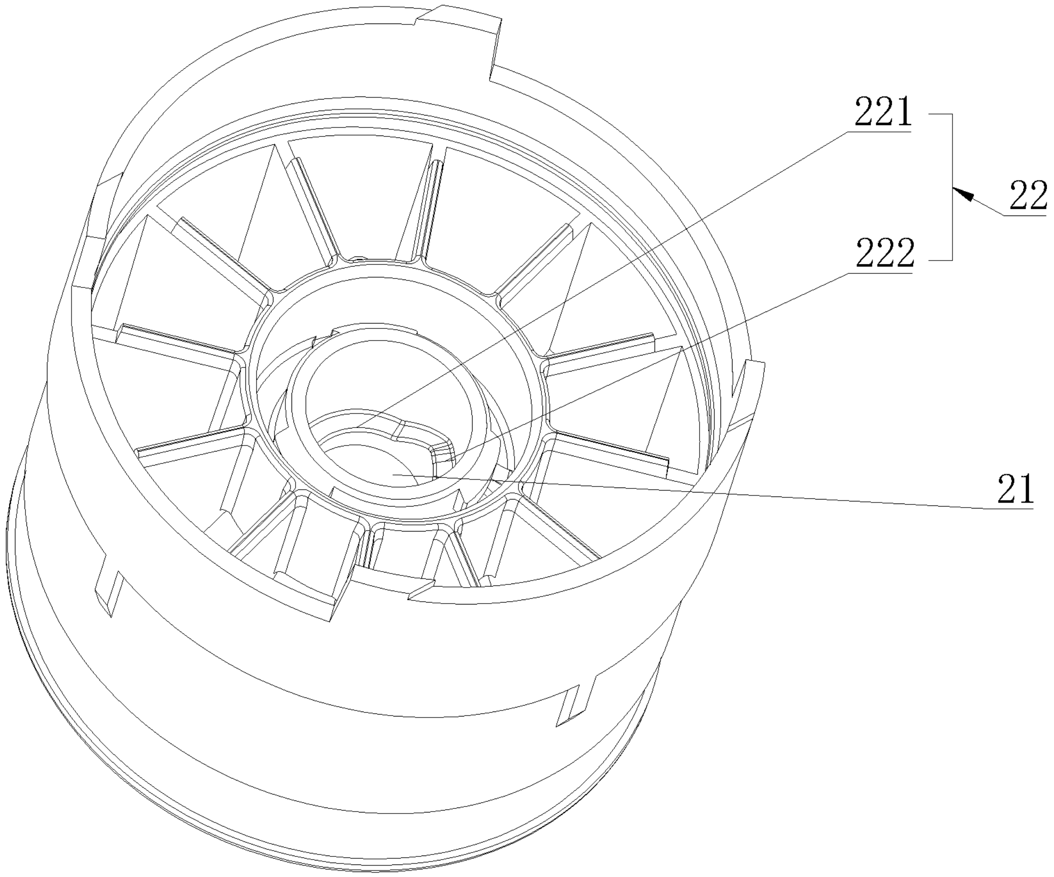
FIG. 7 is a schematic view showing the structure of a diversion mechanism according to the present invention.

With reference to FIGS. 4 and 7, a mounting hole 21 for enabling the fluid diverting mechanism 4 to pass through is provided in the diversion mechanism 2. A step 22 is provided on a side of the mounting hole 21 facing towards the water inlet mechanism 1. Specifically, the step 22 includes a first step surface 221 and a second step surface 222. The first step surface 221 and the second step surface 222 are connected in a smooth transition. Two symmetrically provided protrusions 412 are provided on the outer side of the fluid diverting body 41. The protrusions 412 can move along the first step surface 221 and the second step surface 222 so as to drive the fluid diverting body 41 to move in an axial direction. Furthermore, the communication relationship between the water inlet channel 10 and the first water outlet channel 40 and the second water outlet channel 20 is switched.

Specific implementations of this embodiment are as follows.

When the water inlet channel 10 is in communication with the first water outlet channel 40, the seal 3 is pressed against an inlet 411 of the fluid diverting body 41, and the second water outlet channel 20 is sealed. At this time, water flows through the water inlet member 13 and the fluid diverting body 41 successively, and flows out in functional water, such as spray water, tooth flushing water, blade water or transparent water, etc.

By rotating the diversion mechanism 2, the protrusion 412 of the fluid diverting body 41 moves along the step 22 so as to realize the switching of the communication relationship. When the water inlet channel 10 communicates with the second water outlet channel 20, the seal 3 is pressed against a lower side of the water inlet member 13. At this time, the water flow passes through the water inlet member 13, the fluid diverting body 41, the water outlet body 12 and the diversion mechanism 2 in sequence and is discharged. The sparkling water flows out at this time. The principle of flowing out the sparkling water is prior art, and will not be described in detail here.

Embodiment II

With reference to FIGS. 1-7, a water outlet device includes a fluid diverting mechanism 4, and further includes a water inlet mechanism 1 having a water inlet member 13 with elasticity at a water inlet end, and a diversion mechanism 2 rotatably connected to the water inlet mechanism 1. The water inlet mechanism 1 includes a water inlet channel 10, and the fluid diverting mechanism 4 includes a first water outlet channel 40. The diversion mechanism 2 includes a second water outlet channel 20. When the diversion mechanism 2 moves relative to the fluid diverting mechanism 4, the water inlet channel 10 is in communication with the first water outlet channel 40 or the second water outlet channel 20. When the water inlet channel 10 communicates with the second water outlet channel 20, the fluid diverting mechanism 4 can be pressed against a side of the water inlet member 13.

Referring to FIG. 4, the water inlet member 13 has a water inlet net 131 recessed in the axial direction along the water inlet end of the water inlet mechanism 1 to the water outlet end of the water inlet mechanism 1. A plurality of water outlet holes 132 are provided around the side wall in the radial direction of the water inlet net 131.

Referring to FIG. 4, the side wall in the radial direction of the water inlet net 131 inclines gradually and concavely along the water inlet end of the water inlet mechanism 1 to the water outlet end of the water inlet mechanism 1.

Referring to FIG. 4, a side of the water inlet net 131 facing towards the fluid diverting mechanism 4 is a plane. In the present embodiment, the water inlet member 13 is provided instead of the conventional filter assembly to achieve tolerance absorption under the premise of meeting the filtering requirements of the water outlet device, and to reduce the number of components in the water outlet device, thus reducing the production cost and improving the product yield.

With reference to FIGS. 2 and 3, the water inlet mechanism 1 includes a water diverting body 11 and a water outlet body 12. The water inlet member 13 is embedded on the top of the water diverting body 11. The fluid diverting mechanism 4 is successively arranged through the axial center of the water diverting body 11 and the water outlet body 12. The water diverting body 11 is embedded in the water outlet body 12.

Referring to FIG. 2, the fluid diverting mechanism 4 includes a fluid diverting body 41, a reset member 42, and a functional member 43. The reset member 42 and the functional part 43 are successively arranged in the fluid diverting body 41 along the water inlet end of the fluid diverting body 41 to the water outlet end of the fluid diverting body 41. Both ends of the reset member 42 are respectively pressed against the water inlet end of the water inlet mechanism 1 and the functional member 43. The seal is sleeved outside the water inlet end of the fluid diverting body 41. Preferably, the reset member 42 is a spring. The functional member 43 can be selected according to actual requirements.

Referring to FIG. 5, the top of the seal 3 and the top of the fluid diverting body 41 form a buffer space 30 in the axial direction of the fluid diverting body 41. Preferably, the buffer space 30 has a height h of 0.3 mm to 0.7 mm in the axial direction. In the present embodiment, the height of the buffer space 30 is preferably 0.5 mm.

With reference to FIGS. 4 and 7, a mounting hole 21 for enabling the fluid diverting mechanism 4 to pass through is provided in the diversion mechanism 2. A step 22 is provided on a side of the mounting hole 21 facing towards the water inlet mechanism 1. Specifically, the step 22 includes a first step surface 221 and a second step surface 222. The first step surface 221 and the second step surface 222 are connected in a smooth transition. Two symmetrically provided protrusions 412 are provided on the outer side of the fluid diverting body 41. The protrusions 412 can move along the first step surface 221 and the second step surface 222 so as to drive the fluid diverting body 41 to move in an axial direction. Furthermore, the communication relationship between the water inlet channel 10 and the first water outlet channel 40 and the second water outlet channel 20 is switched.

The working procedure of this embodiment is as follows.

When the water inlet channel 10 is in communication with the first water outlet channel 40, the seal 3 is pressed against an inlet 411 of the fluid diverting body 41, and the second water outlet channel 20 is sealed. At this time, water flows through the water inlet member 13 and the fluid diverting body 41 successively, and flows out in functional water, such as spray water, tooth flushing water, blade water or transparent water, etc.

By rotating the diversion mechanism 2, the protrusion 412 of the fluid diverting body 41 moves along the step 22 so as to realize the switching of the communication relationship. When the water inlet channel 10 communicates with the second water outlet channel 20, the seal 3 is pressed against a lower side of the water inlet member 13. At this time, the water flow passes through the water inlet member 13, the fluid diverting body 41, the water outlet body 12 and the diversion mechanism 2 in sequence and is discharged. The sparkling water flows out at this time. The principle of flowing out the sparkling water is prior art, and will not be described in detail here.

Embodiment III

With reference to FIGS. 1-7, a water outlet device includes a fluid diverting mechanism 4, a seal 3 having elasticity, a water inlet mechanism 1 having a water inlet member 13 at a water inlet end, and a diversion mechanism 2 rotatably connected to the water inlet mechanism 1. The water inlet mechanism 1 includes a water inlet channel 10, and the fluid diverting mechanism 4 includes a first water outlet channel 40. The diversion mechanism 2 includes a second water outlet channel 20. The seal 3 is mounted to a water inlet end of the fluid diverting mechanism 4. When the diversion mechanism 2 moves relative to the fluid diverting mechanism 4, the seal 3 can make the water inlet channel 10 communicate with the first water outlet channel 40 or the second water outlet channel 20. When the water inlet channel 10 communicates with the second water outlet channel 20, the seal 3 can be pressed against a side of the water inlet member 13.

With reference to FIGS. 2 and 6, an elastic seal 5 is embedded in the water outlet end of the water inlet mechanism 1. When the water inlet channel 10 communicates with the first water outlet channel 40, the fluid diverting mechanism 4 can be pressed against the elastic seal 5.

With reference to FIG. 2, the water inlet mechanism 1 includes a water diverting body 11, a water outlet body 12 and a water inlet member 13. The water inlet member 13 is embedded on the top of the water diverting body 11. The fluid diverting mechanism 4 is successively arranged through the axial center of the fluid diverting body 41 and the water outlet body 12. The water diverting body 11 is embedded in the outlet body 12.

Referring to FIGS. 4 to 6, the water inlet member 13 has a water inlet net 131 recessed in the axial direction along the water inlet end of the water inlet mechanism 1 to the water outlet end of the water inlet mechanism 1. A plurality of water outlet holes 132 are provided around the side wall in the radial direction of the water inlet net 131. The water outlet holes 132 are strip-shaped, and the water outlet holes 132 extend from the water inlet end in the direction of the water outlet end. At the same time, the side wall in the radial direction of the water inlet net 131 gradually inclines towards the axial direction along the water inlet end of the water inlet mechanism 1 to the water outlet end of the water inlet mechanism 1. The bottom of the water inlet net 131 is planar, so as to improve the sealing performance between the water inlet net 131 and the seal 3 when the water inlet net 131 abuts against the seal 3 via the planar surface of the bottom, which prevents the water flow from leaking out from the first water outlet channel 40 when the second water outlet channel 20 discharges water. In the present embodiment, the water inlet member 13 is provided instead of the conventional filter assembly to better achieve tolerance absorption due to the strip-shaped water outlet hole 132 also capable of bringing more axial elastic deformation to the water inlet member 13 under the premise of meeting the filtering requirements of the water outlet device, and to reduce the number of components in the water outlet device, thus reducing the production cost and improving the product yield.

Referring to FIG. 2, the fluid diverting mechanism 4 includes a fluid diverting body 41, a reset member 42, and a functional member 43. The reset member 42 and the functional part 43 are successively arranged in the fluid diverting body 41 along the water inlet end of the fluid diverting body 41 to the water outlet end of the fluid diverting body 41. Both ends of the reset member 42 are respectively pressed against the water inlet end of the water inlet mechanism 1 and the functional member 43. The seal 3 is sleeved outside the water inlet end of the fluid diverting body 41.

Referring to FIG. 6, a first limiting stage 413 is provided outside the water inlet end of the fluid diverting body 41, and the seal 3 is sleeved outside the first limiting stage 413.

Referring to FIG. 6, the water inlet end of the fluid diverting body 41 is further provided with a second limiting stage 414. The first limiting stage 413 and the second limiting stage 414 are provided in sequence along the axial direction of the fluid diverting body 41. The seal 3 can be pressed against the second limiting stage 414.

With reference to FIG. 6, a side of the seal 3 facing towards the water inlet end of the water inlet mechanism 1 has a first diversion slope 31. A side of the seal 3 facing towards the water outlet end of the water inlet mechanism 1 has a second diversion slope 32. The first diversion slope 31 inclines gradually and convexly along the water inlet end of the water inlet mechanism 1 to the water outlet end of the water inlet mechanism 1. The second diversion slope 32 inclines gradually and convexly along the water outlet end of the water inlet mechanism 1 to the water inlet end of the water inlet mechanism 1. When the water inlet channel 10 communicates with the first water outlet channel 40, the second diversion slope 32 is pressed against an inlet 411 of the fluid diverting body 41.

Referring to FIG. 5, the top of the seal 3 and the top of the fluid diverting body 41 form a buffer space 30 in the axial direction of the fluid diverting body 41. Alternatively, the buffer space 30 in the axial direction has a height h of 0.3 mm to 1 mm, preferably 0.5 mm. The height h of the buffer space in the axial direction may be up to 1 mm in order to avoid the possibility of negative installation tolerances leading to an inability to completely close the first water outlet channel.

With reference to FIGS. 4 and 7, a mounting hole 21 for enabling the fluid diverting mechanism 4 to pass through is provided in the diversion mechanism 2. A step 22 is provided on a side of the mounting hole 21 facing towards the water inlet mechanism 1. Specifically, the step 22 includes a first step surface 221 and a second step surface 222. The first step surface 221 and the second step surface 222 are connected in a smooth transition. Two symmetrically provided protrusions 412 are provided on the outer side of the fluid diverting body 41. The protrusions 412 can move along the first step surface 221 and the second step surface 222 so as to drive the fluid diverting body 41 to move in an axial direction. Furthermore, the communication relationship between the water inlet channel 10 and the first water outlet channel 40 and the second water outlet channel 20 is switched.

With reference to FIGS. 1 and 6, it further includes a housing 6 and a water outlet rectifying net 7. The housing is sleeved outside the water inlet mechanism 1 and the diversion mechanism 2. The water outlet rectifying net 7 is embedded in the water outlet end of the housing 6 and is clamped with the diversion mechanism 2. A gap is left between the housing 6 and the water inlet mechanism 1. The housing 6 is connected to the diversion mechanism 2 so as to drive the diversion mechanism 2 to rotate relative to the fluid diverting mechanism 4 via the housing 6.

In view of the above, the present invention provides a water outlet device, which is provided with a seal having elasticity, instead of the hard seal at the top of the fluid diverting mechanism in the prior art. On the premise of achieving normal switching of the water outlet channel, the tolerance is absorbed by the deformation quantity of the seal and the water inlet member, thereby reducing the tolerance requirements for each component. Since the tolerance is absorbed, the fluid diverting mechanism will not fail to switch in place. Among them, the water inlet member having elasticity not only has the function of absorbing tolerances, but also acts as a filter screen in the present invention, so as to achieve tolerance absorption and reduce the use of spare parts on the premise of ensuring that the water outlet device has the function of filtering water. Therefore, the product yield is greatly improved under the condition of reducing the production difficulty and production cost.

The above description is only the embodiments of the present invention and do not limit the patent scope of the present invention. Any equivalent transformations made using the content of the description and drawings of the present invention, or the embodiments directly or indirectly applied in related technical fields are also included in the scope of patent protection of the present invention.

What is claimed is:

1. A water outlet device, comprising a fluid diverting mechanism, a seal having elasticity, a water inlet mechanism having a water inlet member with elasticity at a water inlet end, and a diversion mechanism rotatably connected to the water inlet mechanism;

the water inlet mechanism comprises a water inlet channel;

the fluid diverting mechanism comprises a first water outlet channel;

the diversion mechanism comprises a second water outlet channel;

the seal is mounted to a water inlet end of the fluid diverting mechanism, and the seal is capable of placing the water inlet channel in communication with the first water outlet channel or the second water outlet channel when the diversion mechanism moves relative to the fluid diverting mechanism;

when the seal is pressed against a water outlet end of the water inlet mechanism, the water inlet channel communicates with the first water outlet channel; when the seal is pressed against a water outlet side of the water inlet member, the water inlet channel communicates with the second water outlet channel.

2. The water outlet device according to claim 1, wherein the fluid diverting mechanism is installed in the water inlet mechanism and arranged through the axial center of the diversion mechanism; the water inlet mechanism is embedded with an elastic seal at a contact position with the fluid diverting mechanism;

when the water inlet channel communicates with the first water outlet channel, the fluid diverting mechanism presses against the elastic seal.

3. The water outlet device according to claim 1, wherein the water inlet member has a water inlet net recessed in an axial direction along a water inlet end of the water inlet mechanism to the water outlet end of the water inlet mechanism;

a plurality of water outlet holes are provided around a side wall in the radial direction of the water inlet net.

4. The water outlet device according to claim 3, wherein the side wall in the radial direction of the water inlet net inclines gradually and concavely along the water inlet end of the water inlet mechanism to the water outlet end of the water inlet mechanism.

5. The water outlet device according to claim 1, wherein the fluid diverting mechanism comprises a fluid diverting body;

the seal is sleeved outside a water inlet end of the fluid diverting body.

6. The water outlet device according to claim 5, wherein a first limiting stage is provided outside the water inlet end of the fluid diverting body, and the seal is sleeved outside the first limiting stage.

7. The water outlet device according to claim 6, wherein the water inlet end of the fluid diverting body is further provided with a second limiting stage; the first limiting stage and the second limiting stage are provided in sequence along the axial direction of the fluid diverting body; and the seal presses against the second limiting stage.

8. The water outlet device according to claim 5, wherein a side of the seal facing towards a water inlet end of the water inlet mechanism has a first diversion slope; a side of the seal facing towards the water outlet end of the water inlet mechanism has a second diversion slope;

the first diversion slope inclines gradually and convexly along the water inlet end of the water inlet mechanism to the water outlet end of the water inlet mechanism;

the second diversion slope inclines gradually and convexly along the water outlet end of the water inlet mechanism to the water inlet end of the water inlet mechanism; and when the water inlet channel communicates with the first water outlet channel, the second diversion slope is pressed against the water outlet end of the water inlet mechanism.

9. The water outlet device according to claim 5, wherein the top of the seal and the top of the fluid diverting body form a buffer space in the axial direction of the fluid diverting body.

10. The water outlet device according to claim 9, wherein the buffer space has a height of 0.3 mm to 0.7 mm in the axial direction.

11. The water outlet device according to claim 1, wherein the fluid diverting mechanism comprises a fluid diverting body, a reset member having a first end and a second end, and a functional member;

the reset member and the functional member are successively arranged in the fluid diverting body along a water inlet end of the fluid diverting body to a water outlet end of the fluid diverting body; and the first end and the second end of the reset member are pressed against a water inlet end of the water inlet mechanism and the functional member, respectively.

12. A water outlet device comprising a fluid diverting mechanism, wherein the water outlet device further comprises a water inlet mechanism and a diversion mechanism rotatably connected to the water inlet mechanism;

a water inlet end of the water inlet mechanism is provided with a water inlet member having elasticity;

the water inlet mechanism comprises a water inlet channel;

the fluid diverting mechanism comprises a first water outlet channel;

the diversion mechanism comprises a second water outlet channel;

when the diversion mechanism moves relative to the fluid diverting mechanism, the water inlet channel communicates with the first water outlet channel or the second water outlet channel;

when the water inlet channel communicates with the second water outlet channel, the fluid diverting mechanism presses against a side of the water inlet member;

wherein the water inlet member has a water inlet net recessed in an axial direction along the water inlet end of the water inlet mechanism to a water outlet end of the water inlet mechanism;

a plurality of water outlet holes are provided around a side wall in the radial direction of the water inlet net.

13. The water outlet device according to claim 12, wherein the side wall in the radial direction of the water inlet net inclines gradually and concavely along the water inlet end of the water inlet mechanism to the water outlet end of the water inlet mechanism.

14. The water outlet device according to claim 12, wherein a side of the water inlet net facing towards the fluid diverting mechanism is planar.

15. The water outlet device according to claim 13, wherein a side of the water inlet net facing towards the fluid diverting mechanism is planar.

* * * * *